United States Patent [19]
Runyon

[11] Patent Number: 5,447,866
[45] Date of Patent: Sep. 5, 1995

[54] REACTOR FOR MICROORGANISMS AND FEED DEVICE THEREFOR

[75] Inventor: Larry K. Runyon, Temecula, Calif.
[73] Assignee: ECO Soil Systems, San Diego, Calif.
[21] Appl. No.: 190,632
[22] Filed: Feb. 2, 1994
[51] Int. Cl.⁶ .............................................. C12M 1/36
[52] U.S. Cl. ........................................ 435/289; 71/6; 210/610; 210/739; 210/747; 239/10; 239/303; 239/308
[58] Field of Search ................ 435/289; 210/610, 739, 210/747, 143, 170; 239/10, 303, 310, 308; 71/6, 7, 9

[56] References Cited

U.S. PATENT DOCUMENTS 5,227,068 7/1993 Runyon ................................ 210/610

*Primary Examiner*—David A. Redding
*Attorney, Agent, or Firm*—Brown, Martin, Haller & McClain

[57] ABSTRACT

A single, unitary reactor and its feed mechanism for microorganisms, nutrients, and, commonly, also enzymes are disclosed. The reactor forms and dispenses a slurried biomass for turf and soil enhancement, water body treatment and agricultural application through conventional irrigation systems. The feed mechanism feed the various components into the slurry within the reactor on any desired schedule, including different schedules for different components. The microorganisms, nutrients and enzymes are provided in the form of pellets to individual compartments within the feed device, and they are individually injected into the slurry intermittently upon a predetermined schedule. Preferably the housing will contain a plurality of the compartments for a variety of different slurry components. The component pellets may be of any convenient shape and size, but preferably will be either disk-shaped or spherical.

14 Claims, 2 Drawing Sheets

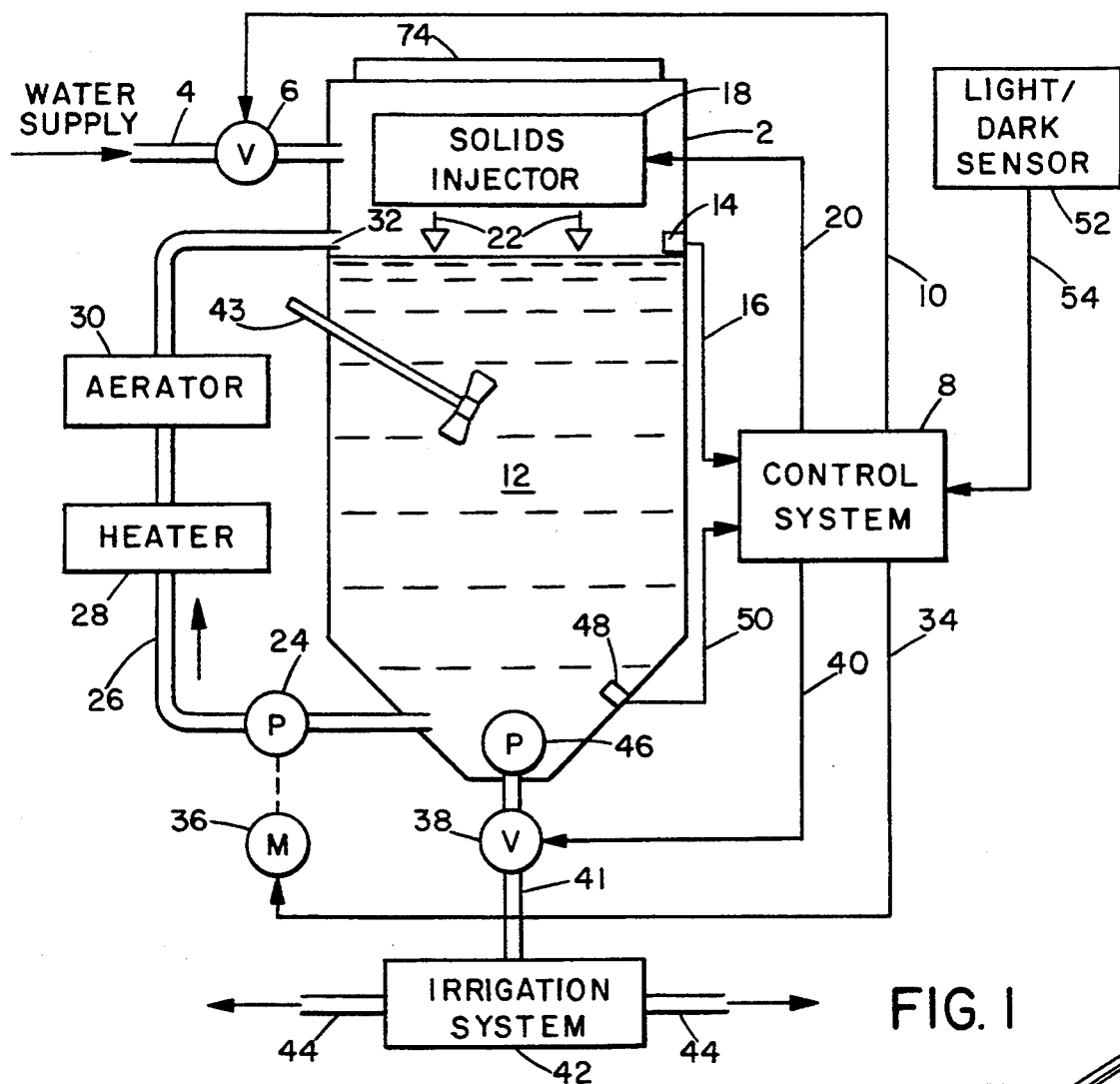
FIG. 1
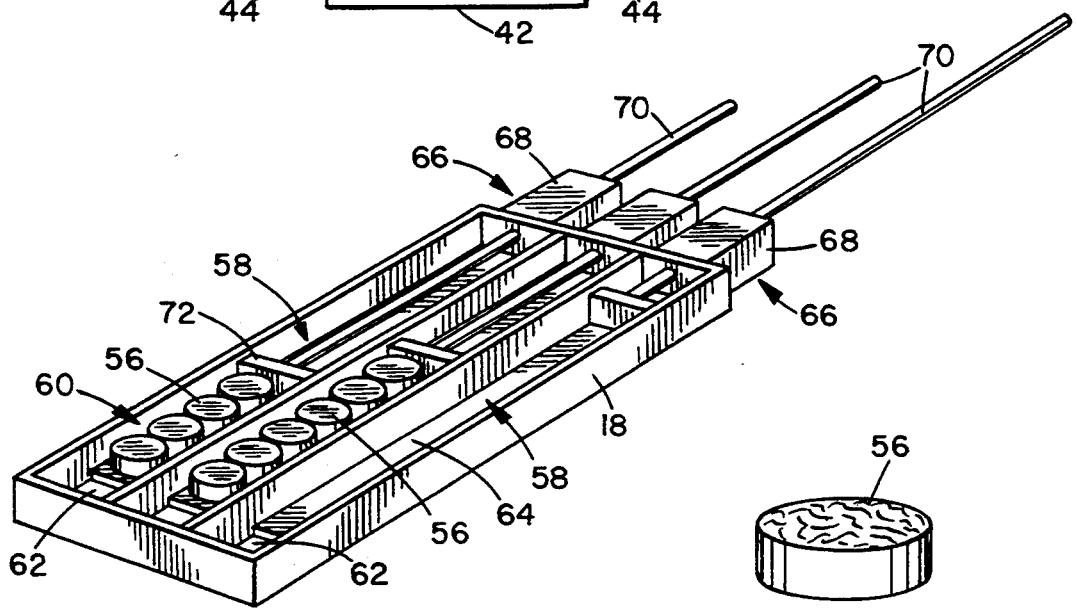
FIG. 2
FIG. 3

REACTOR FOR MICROORGANISMS AND FEED DEVICE THEREFOR

BACKGROUND OF THE INVENTION

1. Field of the Invention:

The invention herein relates to devices for incorporation and use of microorganisms and nutrients into irrigation systems for turf and agriculture.

2. Description of the Prior Art:

Recently Systems have been developed to provide for improved care and growth of turf, such as at golf courses and parks. In these systems, microorganisms beneficial to the turf soil and vegetation, along with enzymes and nutrients for the microorganisms, are inserted into the turf irrigation system and delivered to the soil and vegetation along with the irrigation water. An important factor in the design of these systems has been the recognition that mere application of microorganisms to turf, soil, water ponds, lakes and the like is essentially ineffective, for the microorganisms alone cannot be applied in sufficient quantity to create a growing and self-sustaining microorganism biomass. It is critical that there be simultaneous and repeated application of enzymes and nutrients to support the microorganisms and to permit them to persist and grow sufficiently within the soil to effect the necessary soil enhancements and improvement. Typical of the systems of this type are those illustrated and described in U.S. Pat. Nos. 5,227,067 and 5,227,068.

A wide variety of different types of equipment are useful in these and related processes. Of particular importance is the equipment used to insert the microorganisms, enzymes and nutrients into a water slurry which can be added to the main irrigation system for dispensing throughout the turf area along with the normal irrigation water. Various prior systems have included provision for multiple vessels in which microorganisms, enzymes and nutrients are separately slurried in water and then the various slurries are combined, as well as variations where two or more of the components are slurried in the same vessel and then distributed to the irrigation system. Of course, the more functions that can be incorporated into a single equipment unit the less overall cost and space will be required for the microorganism, enzyme and nutrient feed system. It is particularly desirable to have all of these functions in a single unit.

In the past, however, there have been no units available which provide for automatic feed of all of the components in a single unit, particularly when the components are to be fed into the slurry in different quantities or at different feed rates or intervals. For instance, a single initial injection of microorganisms into the water may be sufficient to initiate the growth of the microorganism pool in the slurry. However, the nutrients for the microorganisms will have to be added repeatedly and on an increasing schedule as the microorganism biomass grows in the slurry before the slurry is injected into the irrigation system.

What has been true for turf, soil and water bodies also applies equally to agriculture. As with the turf applications, uses of microorganisms in large scale farming has not been successful because the requirement of providing the microorganisms with nutrients on a sustained basis has not been recognized. Further, delivery equipment sufficient to adequately service large areas of crops has not been available.

SUMMARY OF THE INVENTION

The present invention is a significant improvement over the devices and systems of the prior art. It utilizes a single vessel or "reactor" in which all of the various microorganisms, enzymes and nutrients can be added in any desired combination and on any desired schedule, including different schedules for different components. Once a suitable biomass has grown (usually within about one day) the biomass can be injected, preferably automatically, into the irrigation system for dispensing throughout the irrigated area. The invention is applicable to turf and soil areas, such as golf courses and parks; to bodies of water such as irrigation ponds and small lakes; and to agricultural areas, such as crop fields and individual areas of crops, including large scale crop growing areas.

In one embodiment, the invention is a feed device for a reactor within which microorganisms and nutrients therefor are dispersed in a volume of water in the reactor and from which the microorganism-containing water is subsequently dispersed for irrigation, the device comprising: a housing; a source of microorganisms and nutrients, the source providing the microorganisms and nutrients in the form of pellets; at least one compartment within the housing, the compartment having a size and shape sufficient to contain a plurality of the pellets; an opening in the compartment of a size sufficient to permit passage therethrough of a pellet and communicating with the volume of water, the opening being positioned with respect to the volume of water such that a pellet passing through the opening moves by gravity into the water; urging means within the compartment for urging the pellets seriatim to the opening for passage therethrough into the water; and regulating means for regulating the operation of the urging means such that the pellets are urged intermittently to the opening upon a predetermined schedule. Preferably the housing comprises a plurality of the compartments, each having urging means associated therewith. The pellets may be of any convenient shape and size, but preferably will be either disk-shaped or spherical. Enzymes may also be present with the microorganisms and nutrients.

In another embodiment, the invention is a microrganism reactor comprising a vessel having a hollow interior; inlet liquid conduit means for supplying liquid to the interior of the vessel to form a predetermined volume of fluid within the interior, the volume being less than the volume of the hollow interior; outlet liquid conduit means for removing liquid from the interior of the vessel; a feed device disposed within that portion of the interior not occupied by the volume of liquid, the device comprising: a housing; a source of the microorganisms and nutrients, the source providing the microorganisms and nutrients in the form of pellets; at least one compartment within the housing, the compartment having a size and shape sufficient to contain a plurality of the pellets; an opening in the compartment of a size sufficient to permit passage therethrough of a pellet and communicating with the volume of water, the opening being positioned with respect to the volume of liquid such that a pellet passing through the opening moves by gravity into the liquid; urging means within the compartment for urging the pellets seriatim to the opening for passage therethrough into the liquid; and regulating means for regulating the operation of the urging means such that the pellets are urged intermittently to the opening upon a predetermined schedule; and control means for controlling inflow and outflow of liquid to and from the interior of the vessel at predetermined intervals with sufficient residence time of the microorganisms and nutrients within the liquid to permit the microorganism population to obtain a significant increase, and the outflow thereafter dispensing the microorganism-containing liquid dispersed for irrigation.

BRIEF DESCRIPTION OF THE DRAWINGS

FIG. 1 is a schematic diagram of a reactor system of the present invention, also indicating the feed device of this invention as well as related component parts of the reactor and the irrigation system.

FIG. 2 is a perspective view of one embodiment of the feed device of this invention.

FIG. 3 is a perspective view of one embodiment of a nutrient or microorganism pellet used in the feed device.

DETAILED DESCRIPTION AND PREFERRED EMBODIMENTS

Figure 4:
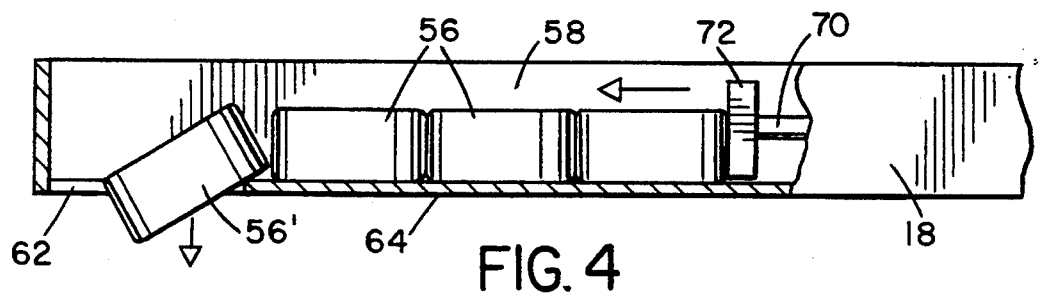
FIGS. 4 and 5 are side views, partially cut away, illustrating alternative modes of operation of the feed device.
Figure 5:
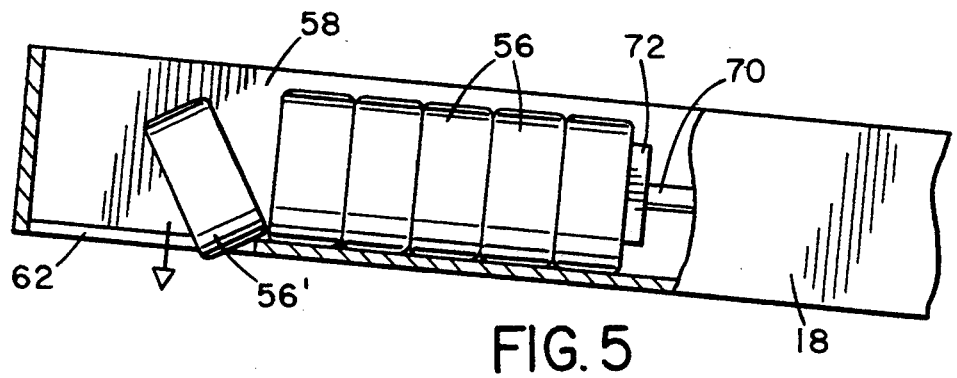

The device of this invention is best understood by reference to the drawings.

FIG. 1 shows the reactor 2 and its relationship to other parts of the irrigation system. Water for the slurry is brought into reactor 2 through water supply conduit 4. Control valve 6 in conduit 4 is controlled by control system 8 through line 10. The water to form the water body or slurry 12 is accumulated in reactor 2. The amount of water allowed into the bioreactor through valve 6 is determined by maximum liquid level sensor 14 which is monitored by control system 8 through line 16. When the appropriate volume of water has accumulated for the slurry 12 and reached sensor 14, control system 8 closes valve 6 to prevent further water entry.

The size of reactor 2 will be dependent upon the size of the irrigated area and the concentration in microorganisms are to be applied. Application to areas such as golf courses and turf farms will normally require smaller microrganism reactors than larger and more intensive types and areas of application such as use in large scale farming and crop maintenance. Those skilled in the art will readily be able to determine optimum reactor size for any specific end use.

Once the proper amount of water has been collected in reactor 2, the injection of the microorganisms and nutrients therefor (and usually also enzymes) is initiated from solids injector 18 by an appropriate signal from control system 8 through line 20. The injectors 18 will be described in more detail below. The various solids are injected into the water 12 as indicated at arrows 22, where they dissolve or disperse and allow the build-up of the body of microorganisms. The slurry 12 containing the various microorganisms, enzymes and nutrients is normally circulated for heating and aeration by pump 24 in recycle conduit 26. The slurry water passes through heater 28 and aerator 30 before being returned to the reactor 2 at 32. Oxygenation of the slurry is provided by the aerator 30, and the degree of oxygen incorporated into the slurry will be based on the types of microorganism being grown. The amount of recycle passing through conduit 26, the temperature and time of operation of the heater 28 and the degree of aeration of aerator 30 are all matters of choice by the operator and will be readily determined according to the particular microorganisms, enzymes and nutrients present. It is also important not to overfeed or overoxygenate the microorganisms, since the resultant biomass can become degraded. Those skilled in the art will have no difficulty determining the appropriate types of operation to be used in the recycle, heating and aeration. Control of the pump 24, heater 28 and/or aerator 30 can be from control system 8 as shown by control of pump motor 36 through line 34 or can be through independent control systems for one or more of the units (not shown).

Commonly with the repeated injection of nutrients and enzymes, the initial microorganism injection will grow to a suitable slurry concentration for injection into the irrigation system in a relatively short time period, commonly on the order of about 24 hours. Once the desired concentration of microorganisms has been achieved, the injection unit 18 is turned off and valve 38 is opened by control system 8 through line 40 to allow the concentrated slurry 12 to flow out of the reactor vessel 2 by gravity through conduit 41 into irrigation system 42 from which it can be dispersed through conduits 44 to the various parts of the irrigated turf, soil, water or agricultural area. If the positioning of the reactor 2 and the irrigation system inlet 42 is such that gravity flow through valve 38 is not possible or there is an insufficient gravity flow rate to empty reactor 2 in a reasonable period of time, emptying of slurry 12 from reactor 2 may be aided or fully accomplished by optional pump 46, placed either in conduit 41 or within the reactor 2 at the inlet of conduit 41. In addition, the inlet to irrigation system 42 may be in the form of a venturi such that flow of the irrigation water through the venturi inlet aspirates the slurry from the reactor by suction.

As the slurry level drops in reactor 2, the top surface of the slurry 12 eventually reaches the level of minimum liquid level sensor 48 which is monitored by control system 8 through line 50. When the surface reaches sensor 48, the control system 8 closes valve 38 (and also turns off pump 46 if necessary) so that the liquid level will not drop further within the reactor 2. Thereafter the filling cycle begins again with opening of valve 6 and injection of a new water supply for slurry 12 through conduit 4, followed by incorporation of a new supply of microorganism, enzyme and nutrient from solids injector 18 into the water to form a new slurry 12.

As will be evident from the above description, the entire sequence can and normally will be automated with the control system 8 and any other controls such as those for heater 28 and/or aerator 30 being controlled by an appropriate computer and system software.

The microorganisms preferably useful in this invention grow by means of a consistent supply of nutrients and availability of adequate oxygen. It is not preferred to use microorganisms which rely on photosynthesis and are therefore dependent upon the presence of light for growth. However, if it is desired to use such microorganisms, the reactor 2 can incorporate its own lighting system to provide light for the microorganism growth either by being made of a clear or translucent material which allows ambient light into the slurry 12 or by having artificial light positioned such that the artificial light is focused into the slurry 12.

Figure 6:
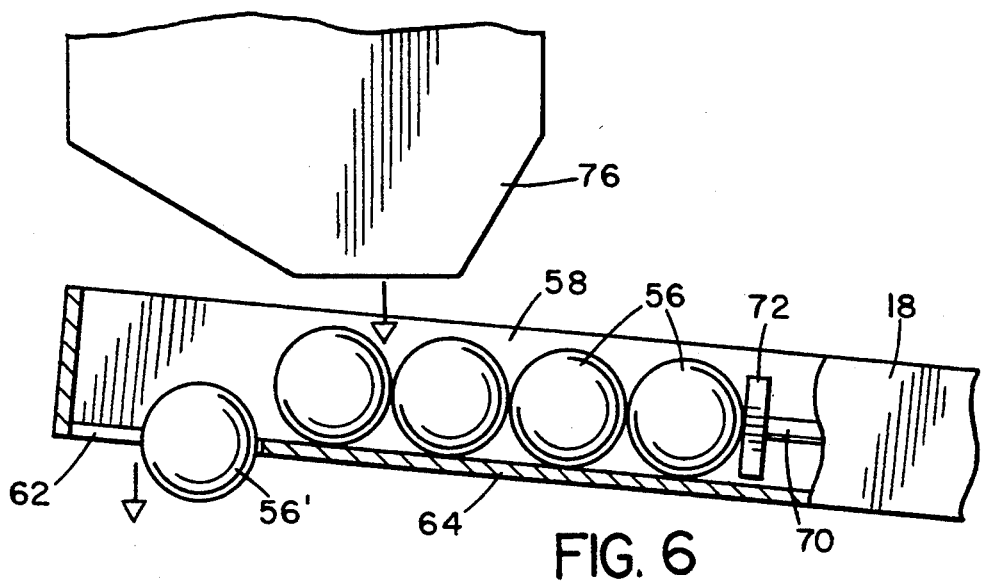
FIG. 6 is a view similar to that of FIGS. 4 and 5, illustrating another embodiment of a nutrient or microorganism pellet and the operation of the feed device for such pellet, as well as means of charging the feed device with such pellets.

The growth of the microorganisms may also be aided by mechanical mixing of the body of water 12, either or both by the recycle through conduit 26 or by application of mechanical mixer 43 to the slurry 12. Both recycle and mixer usage are common in reactors and those skilled in the art will be well aware of the techniques and equipment available and how such should be used. The degree of turbulence induced by either the mixer or the recycle must be kept within relatively low limits, to avoid shear degradation of the microorganism biomass, particularly as the microorganism biomass becomes concentrated toward the end of each growth cycle. A light/dark sensor 52 may communicate with control system 8 through line 54 to allow control system 8 to operate artificial lighting systems as needed and also to ensure that the concentrated slurry is incorporated into the irrigation system at the optimum time during the day/night cycle for the dispersion of the microorganisms throughout the turf and soil area.

The form in which the microorganisms, enzymes and nutrients are initially brought into the dispensing system are best illustrated in FIGS. 3 and 6. The different types of microorganisms, enzymes and nutrients will be formed into individual "pellets" 56, which commonly will be either in the shape of a disk, as shown in FIG. 3, or a sphere as shown in FIG. 6. A pellet 56 will be of any convenient size for ease of movement through the injector 18, and commonly will be on the order of approximately 0.5–2 inches diameter (12–50 mm) for the sphere of FIG. 6 and a diameter of 0.5–2 inches (12–50 mm) and thickness of 0.25–1 inch (6–25 mm) for the disk of FIG. 3. Of course other sizes and shapes may be used if desired, provided that they will move freely and sequentially through the injector 18 without jamming, aggregating or otherwise being able to be dispenses evenly and at the appropriate intervals into the water body 12.

The operation of the solids injector 18 is best illustrated in FIG. 2. The injector 18 is made up of a series of compartments 58, each of with is of a width and depth sufficient to maintain the pellets 56 in designated line or order as indicated at 60 in FIG. 2. The width of each compartment 58 should be sufficient to provide a slight clearance along either longitudinal side for the pellet 56, but not to provide a space so wide that the pellets will wedge together and prevent movement along the length of the compartment 58. Usually the compartments 58 will be aligned and parallel as illustrated, since that provides the most compact structure, but it will be recognized that alignment of compartments 58 is not necessary, as long as all compartments discharge their respective pellets 56 into the slurry 12 in an effective manner.

The length of the compartment 58 may be any length sufficient to hold a desired quantity of pellets 56 for movement along the compartment 58 and feeding into the slurry 12 over a predetermined period of time. The pellets may be arrayed either as a line of spheres as shown in FIG. 6 or as the disks of FIG. 3 being laid flat as shown in FIG. 4 or standing on their peripheral edges as shown in FIG. 5.

At one end of each compartment 58 is an opening 62 in the bottom 64 of the injector 18. The opening 62 is of sufficient size to permit one pellet 56 to pass through at a time. The opening 62 is positioned at some point above the slurry 12 surface so that the pellet 56 when it drops through the opening 62, as indicated at 56', will drop directly into the slurry water 12 where it will be dissolved or otherwise separated into its constituents components of the individual microorganisms, enzymes or nutrients. To aid in this dissolution or dispersion the pellets 56 are normally somewhat porous and are sufficiently cohesive to remain intact during movement through the compartments 58 (and from the hopper 76 or other feed device), but are readily dissolved or otherwise separated promptly when the pellet 56 is dropped into the slurry water 12. Water dissolution and dispersion are well known and the appropriate degree of cohesiveness of the pellets can be readily determined by the user.

The different types of pellets 56 are moved through the compartments 58 by means of pushing devices 66. Pushing devices 66 are formed of a motor drive 68, such as a screw drive through which is threaded a rod 70 which can be moved forward or backward by a conventional worm drive within drive motor 68. The rod 70 terminates in pusher plate 72 which, under the motion of rod 70 being driven by motor 68, gently urges the pellets 56 forward so that the lead pellet 56' drops through opening 62 in the prescribed sequence and schedule to be dissolved in slurry water 12.

It will be evident that the different pusher mechanisms 66 work at different times, speeds and frequencies, depending on the composition of each type of pellet being moved forward in each compartment. Those pushing the microorganism pellets will normally operate less frequently then those pushing the nutrient and/or enzyme pellets. The specific movement and feed rate of the pushers in each respective compartment 58 can be readily determined by those skilled in the art, knowing the compositions of the various pellets and the desired microorganism/nutrient/enzyme concentration to be obtained in the slurry 12, The rate and frequency of movement can be controlled automatically by control system 8.

As the pellet supply in a particular compartment comes close to being exhausted, but usually before the last pellet 56 has been dispensed through opening 62, a sensor (not shown)incorporated into motor drive mechanism 68 and responsive to a predetermined position of rod 70 and pusher plate 72 will generate a signal to control system 8. In response, control system 8 will reverse motor drive 68 and cause the pusher mechanism 66 to be fully retracted to the end of compartment 58 so that additional pellets 56 can be added into the compartment 58 before the time that the next movement of the pusher system to inject another pellet 56 is required. It is possible for pellets 56 to be added to the compartments 58 manually, as by having the injector 18 positioned immediately below a hatch 74 in the reactor 2 which can be opened by a worker for access to the injector 18 and compartments 58. More desirably, however, the system can be automated by having the injector 18 positioned below a feed hopper 76 in which are contained a large quantity of the pellets 56. When the pushing mechanism 66 is retracted, the control system 8 can also activate a dump valve (not shown) within the hopper 76 to release a predetermined number of pellets 56 to fall into the compartment 58 to restock the compartment. When the compartment 58 is again full, the control system 8 will close the dump valve of the hopper 76 and reset the motor drive mechanism 68 for the next movement of rod 70 and pusher plate 72 to inject another pellet 56 into the water body 12 when called for by the appropriate schedule. The use of the hopper is easiest for spherical pellets as in FIG. 6 although a feed hopper 76 can be designed for use with disk shape pellets of FIG. 3 with control of the orientation of the disk shape pellets 56 as they are fed into the compartment 58.

Typical of the various materials which can comprise the pellets 56 are different microorganisms, either singly per pellet or in various mixtures of microorganisms per pellet. Many of the microorganism mixtures, as well as appropriate nutrients and enzymes, are commercially sold as proprietary products. Those skilled in the art will be able to determine appropriate materials by selecting those which provide the desired turf functions, including oxygen-supply and salt affinity.

Some microorganisms are designated "soil enhancing" and include thermophiles as archaebacteria, described in Brock et al., *Biology of Microorganisms* (5th edn., 1988) §18.6; microorganisms which utilize hydrocarbons as nutrients, such as pseudomonas and mycobacterium (Brock et al., §16.23); nitrogen fixating bacteria such as azotobacter spp. cyanobacteria and *bacillus polymyxa* (Brock et al., §16.24); and halophiles such as halobacterium (Brock et al., §19.33). Further typical microorganisms are oxygen-generating bacteria exemplified by a microorganism product commercially available under the trade name "AG-14" from Natural Oxygen Products of El Paso, Tex., and described in U.S. Pat. No. 3,855,121, as well as similar microorganisms such as pseudomonas, flavobacterium, *bacillus polymyxa* and *bacillus sphaericus*, described respectively at Brock et al., §§19.15, 19.20, and 19.26 (the two Bacillus spp.), as well as euglina spp., described in Moore et al., *Biological Science* (1963), pp. 248-249. Numerous microbial nutrients and enzymes are known, and exemplified by a product commercially available under the trade name "BNB-931" from Westbridge Company of Carlsbad, Calif., and a chelated product commercially available under the trade name "Sun-Up"; in this product the chelating agent is citric acid. Microorganisms which function as insecticides, fungicides and/or herbicides may also be grown and delivered by the present system as such microorganisms become available and approved for applications such as pest and fungus control. Frost control microorganisms can also be applied through the present system.

It will be evident that there are numerous embodiments of this invention which, while not expressly set forth above, are clearly within the scope and spirit of the invention. The above description, therefore intends to be exemplary only, and the scope of the invention is to be determined solely by the appended claims.

I claim:

1. A feed device for a reactor within which microorganisms and nutrients therefor are dispersed in a volume of liquid in said reactor and from which said microorganism-containing liquid is subsequently dispersed for irrigation, said device comprising:
   a housing;
   a source of said microorganisms and nutrients, said source providing said microorganisms and nutrients in the form of pellets;
   at least one compartment within said housing, said compartment having a size and shape sufficient to contain a plurality of said pellets;
   an opening in said compartment of a size sufficient to permit passage therethrough of a pellet and communicating with said volume of liquid, said opening being positioned with respect to said volume of liquid such that a pellet passing through said opening moves by gravity into said liquid;
   urging means within said compartment for urging said pellets seriatim to said opening for passage therethrough into said liquid; and
   regulating means for regulating the operation of said urging means such that said pellets are urged intermittently to said opening upon a predetermined schedule.

2. A feed device as in claim 1 wherein said housing is positioned within said reactor and above said volume of liquid.

3. A feed device as in claim 1 wherein said housing comprises a plurality of said compartments, each having urging means associated therewith.

4. A feed device as in claim 3 wherein said regulating means separately regulates the operation of each said urging means upon an individual predetermined schedule.

5. A feed device as in claim 1 wherein said pellets are disk-shaped.

6. A feed device as in claim 1 wherein said pellets are spherical.

7. A feed device as in claim 1 wherein said liquid is water.

8. A reactor comprising:
   a vessel having a hollow interior;
   inlet liquid conduit means for supplying liquid to said interior of said vessel to form a predetermined volume of fluid within said interior, said volume being less than the volume of said hollow interior;
   outlet liquid conduit means for removing liquid from said interior of said vessel;
   a feed device disposed within that portion of said interior not occupied by said volume of liquid, said device comprising:
      a housing;
      a source of said microorganisms and nutrients, said source providing said microorganisms and nutrients in the form of pellets;
      at least one compartment within said housing, said compartment having a size and shape sufficient to contain a plurality of said pellets;
      an opening in said compartment of a size sufficient to permit passage therethrough of a pellet and communicating with said volume of water, said opening being positioned with respect to said volume of liquid such that a pellet passing through said opening moves by gravity into said liquid;
      urging means within said compartment for urging said pellets seriatim to said opening for passage therethrough into said liquid; and
      regulating means for regulating the operation of said urging means such that said pellets are urged intermittently to said opening upon a predetermined schedule; and
   control means for controlling inflow and outflow of liquid to and from said interior of said vessel at predetermined intervals with sufficient residence time of said microorganisms and nutrients within said liquid to permit said microorganism population to obtain a significant increase, and said outflow thereafter dispensing said microorganism-containing liquid dispersed for irrigation.

9. A reactor as in claim 8 wherein said housing comprises a plurality of said compartments, each having urging means associated therewith.

10. A reactor as in claim 9 wherein said regulating means separately regulates the operation of each said urging means upon an individual predetermined schedule.

11. A reactor as in claim 8 wherein said pellets are disk-shaped.

12. A reactor as in claim 8 wherein said pellets are spherical.

13. A reactor as in claim 8 wherein said liquid is water.

14. A reactor as in claim 8 wherein said control means retains said microorganisms and nutrients within said vessel for a residence time period of approximately one day.

* * * * *